United States Patent
Hawkins

(10) Patent No.: US 8,589,006 B2
(45) Date of Patent: Nov. 19, 2013

(54) METHOD OF CONTROLLING OIL DELIVERY IN A VEHICLE FOR DECELERATION OR OIL WARMING

(75) Inventor: Shawn Scott Hawkins, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 237 days.

(21) Appl. No.: 13/220,770

(22) Filed: Aug. 30, 2011

(65) Prior Publication Data

US 2013/0054058 A1    Feb. 28, 2013

(51) Int. Cl.
*B60W 20/00*    (2006.01)
*B60W 10/08*    (2006.01)

(52) U.S. Cl.
USPC .......................................................... 701/22

(58) Field of Classification Search
USPC .................................................... 701/22
See application file for complete search history.

(56) References Cited

U.S. PATENT DOCUMENTS

| | | | |
|---|---|---|---|
| 5,181,837 A | | 1/1993 | Niemiec |
| 2007/0265129 A1* | | 11/2007 | Kasuya et al. .................. 475/32 |
| 2011/0082630 A1* | | 4/2011 | Kawaguchi et al. ............ 701/58 |
| 2011/0084561 A1 | | 4/2011 | Swales et al. |
| 2012/0258831 A1* | | 10/2012 | Knoblauch et al. ............... 475/5 |
| 2013/0124027 A1* | | 5/2013 | Tanishima et al. .............. 701/22 |

\* cited by examiner

*Primary Examiner* — Helal A Algahaim
*Assistant Examiner* — Yazan A Soofi
(74) *Attorney, Agent, or Firm* — Quinn Law Group, PLLC

(57) ABSTRACT

A vehicle is provided with a controller that implements a method of controlling oil delivery to the vehicle. The method includes increasing at least one of rate of flow of oil and pressure of oil flowing from an oil pump to a motor/generator or to a gearing arrangement that is operatively connected to the vehicle wheels, thereby increasing resistance to rotation of a rotor of the motor/generator or of the gearing arrangement and slowing the vehicle wheels as well as increasing the oil temperature to reduce friction losses. The controlled oil delivery is in response to a vehicle operating condition such as a condition indicative of a desired decrease in torque at the vehicle wheels or oil temperature below a predetermined temperature.

14 Claims, 2 Drawing Sheets

METHOD OF CONTROLLING OIL DELIVERY IN A VEHICLE FOR DECELERATION OR OIL WARMING

TECHNICAL FIELD

The invention relates to a method of controlling oil delivery in a vehicle for decelerating the vehicle or for warming the oil and to a vehicle having a controller that implements the method.

BACKGROUND

One purpose of electric vehicles, extended range electric vehicles, and hybrid electric vehicles is to utilize energy in an efficient manner. For example, when a vehicle is decelerated, rather than dissipating kinetic energy through friction at vehicle brakes, the vehicle may be operated in a regenerative braking mode by controlling a motor/generator to operate as a generator to convert some of the kinetic energy into electric energy stored in an energy storage device, such as a battery. The stored electric energy is subsequently used when the motor/generator acts as a motor in providing torque to propel the vehicle. Under some vehicle operating conditions, however, such energy conversion through regenerative braking is limited. For example, when the energy storage device is fully charged or nearly fully charged, it cannot accept additional electric energy, and at least some of the rotational energy must be dissipated at the brakes. This condition may exist at the beginning of a drive, when the vehicle is nearly or fully charged, or after a period of extended downhill regenerative braking.

SUMMARY

A vehicle with a rotating component operatively connected to vehicle wheels is provided with a controller that implements a method of controlling oil delivery to slow the wheels through friction drag created by transmission oil acting upon either or both of a rotor of a motor/generator and a gearing arrangement that is operatively connected to the wheels. Alternately, the controlled oil delivery may be for the purpose of warming the oil, which decreases friction losses. In a hybrid vehicle or an electric vehicle, the method may be implemented when the state of charge of an energy storage device is high and regenerative braking may not be feasible. Specifically, in one embodiment, a vehicle is provided that has wheels and an electric motor/generator operatively connected to the wheels. The rotating component is a rotor of the electric motor/generator. A stator and the rotor are arranged to define an annular gap between the stator and the rotor. An energy storage device is operatively connected to the stator for providing power to the motor/generator to cause the motor/generator to function as a motor and for receiving power from the motor/generator to cause the motor/generator to function as a generator. An oil pump is operatively connected to the motor/generator and operable to provide oil flow to the motor/generator. An electronic controller is operatively connected to the oil pump, to the wheels, and to the energy storage device and is configured to increase at least one of a rate of flow of oil and pressure of oil provided to the motor/generator by the oil pump under at least one predetermined vehicle operating condition to increase friction force on the rotor due to oil in the annular gap, thereby slowing the wheels. The oil may be alternatively or additionally provided to a gearing arrangement operatively connected to the wheels to slow the wheels. Furthermore, the oil will be heated by contacting the motor/generator and/or the gearing arrangement, which will decrease friction losses.

Specifically, the controller implements a method of controlling oil delivery in a vehicle. The method includes increasing at least one of rate of flow of oil and pressure of oil flowing from an oil pump to at least one of a motor/generator and a gearing arrangement operatively connected to the vehicle wheels, thereby increasing resistance to rotation of the motor/generator or the gearing arrangement to slow the vehicle wheels and/or increasing oil temperature to decrease friction losses. The increasing rate of flow of oil or oil pressure from the pump is in response to a vehicle operating condition, such as an indication of a desired decrease in torque at the vehicle wheels or an indication of a low oil temperature. The vehicle operating conditions may include an operating condition of a driver-operated vehicle braking device, such as a brake pedal, and an operating condition of a driver-operated vehicle acceleration device, such as an accelerator pedal, that indicate a desired deceleration. The vehicle operating conditions may also include a state of charge of the energy storage device greater than a predetermined state of charge, a level of charge power of the energy storage device less than a predetermined level of charge power, a transmission gear selector positioned in a predetermined position, such as an indication of the vehicle being on a downhill grade. Under these operating conditions, the oil delivery is controlled to decelerate the vehicle and/or to increase the oil temperature.

The increased frictional drag due to the oil directly translates into drag that slows the vehicle wheels without putting any additional energy into the energy storage device. In hybrid or electric vehicles, this enables a lower state of charge of the energy storage device for the next regenerative braking event, and, by keeping the level of charge power lower, may prolong the life of the energy storage device. The temperature of the friction brake pads is also kept lower than if braking were accomplished solely by the brakes, thus potentially prolonging the life of the brake pads. Also, by controlling the oil delivery to the motor/generator, the motor/generator may operate a different torque value which might be more efficient. The transmission oil is warmed by the motor/generator, which reduces transmission spin losses.

The above features and advantages and other features and advantages of the present invention are readily apparent from the following detailed description of the best modes for carrying out the invention when taken in connection with the accompanying drawings.

DETAILED DESCRIPTION

Figure 1:
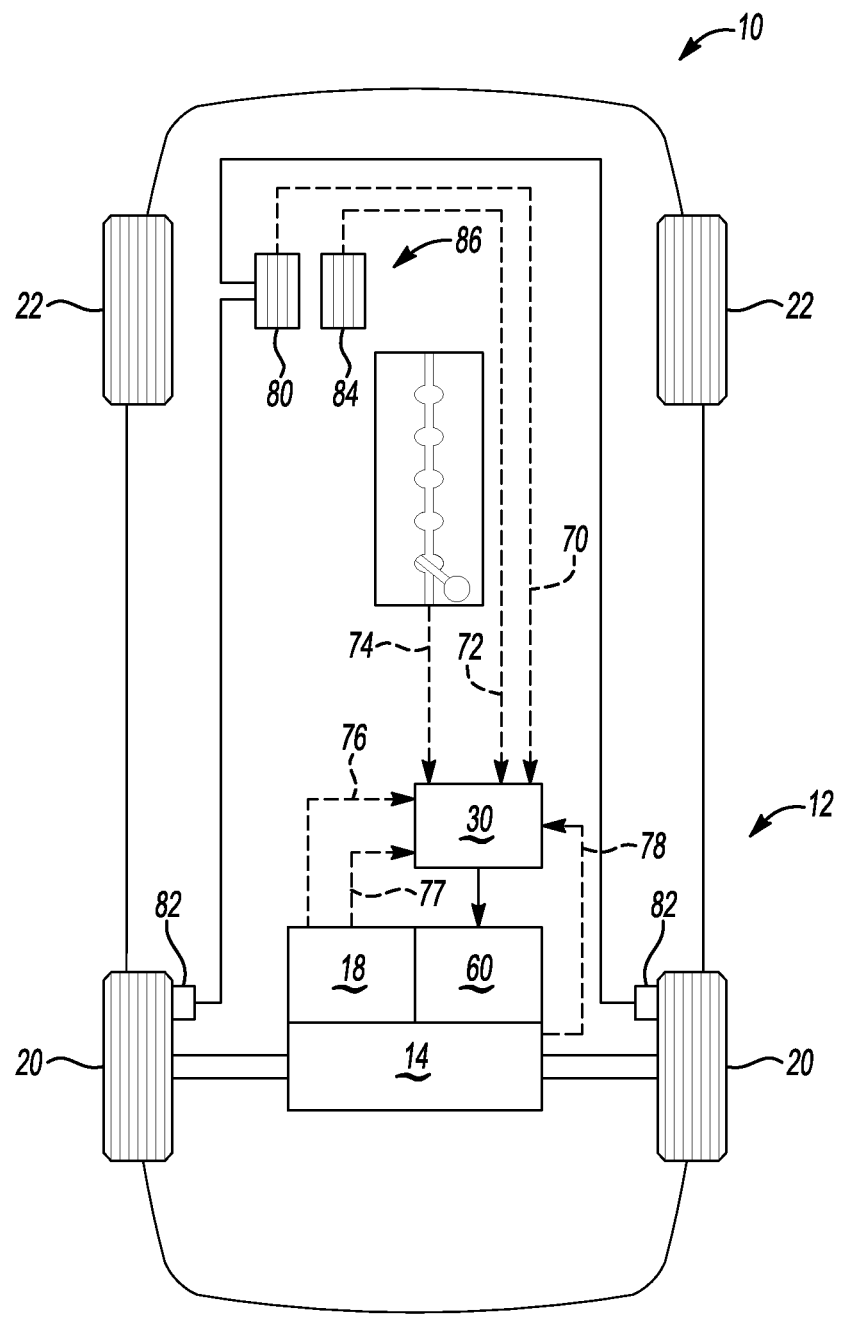
FIG. 1 is a schematic illustration in plan view of a vehicle.
Figure 2:
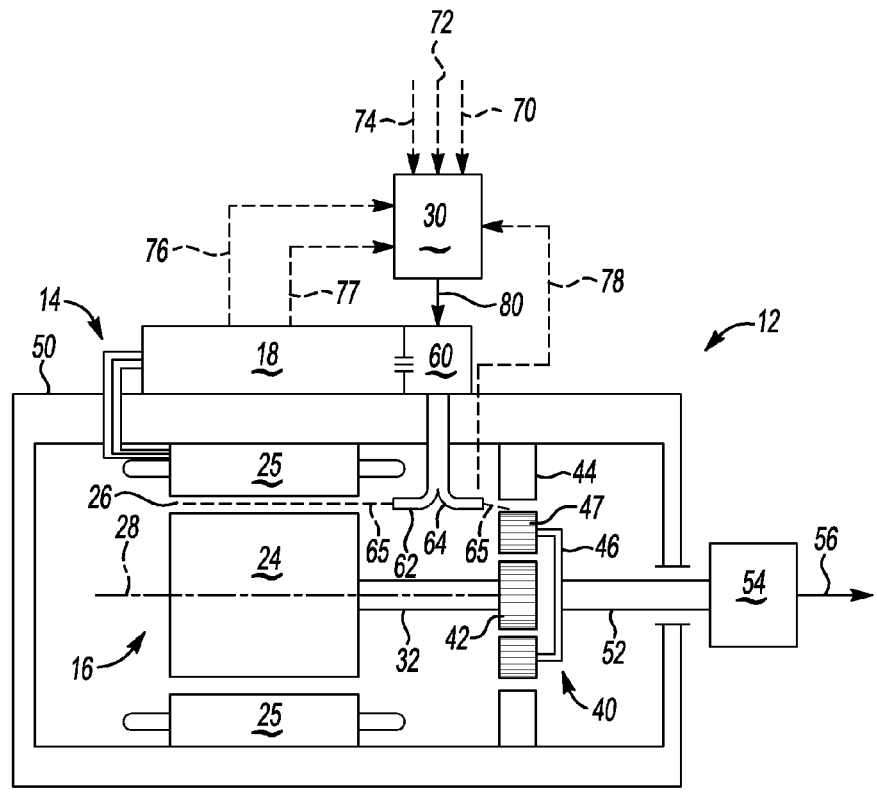
FIG. 2 is a schematic cross-sectional illustration of a portion of the vehicle including a transmission, a motor/generator and an oil pump.

Referring to FIGS. 1 and 2 of the drawings, wherein like reference numbers refer to like components throughout the several views, a vehicle 10 has a powertrain 12 with a transmission 14. The transmission 14 has a single electric motor/generator 16 that receives electrical power from an energy storage device 18 and is used to propel vehicle wheels 20. The energy storage device 18 may be one or more batteries. Such a vehicle 10 may be referred to as a battery electric vehicle, as it has no internal combustion engine or other prime mover.

Figure 3:
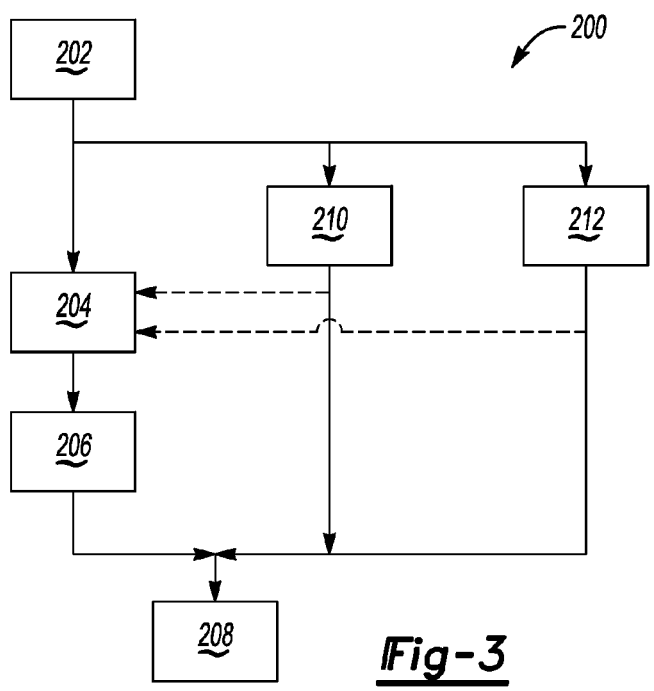
FIG. 3 is a flowchart of a method of controlling oil delivery in the vehicle of FIGS. 1 and 2.

The wheels 20 may be decelerated according to a method 200 described with respect to FIG. 3. The method 200 may be applied to other types of vehicles having a motor/generator that rotates at a speed proportional to the wheels 20, as the method 200 is not limited to a battery electric vehicle. For example, the method 200 may be used for a vehicle that is a hybrid electric vehicle, having one or more motor/generators and an engine, whether a plug-in type hybrid or not, or an extended range electric vehicle powered by an electric motor and having an internal combustion engine that powers a generator to continue allowing use of the electric motor when the charge of the energy storage device falls. The method 200 may also be used on a non-hybrid automatic transmission that has a gearing arrangement 40 as described below but does not have a motor/generator. The vehicle 10 has only one pair of wheels 20 that are propelled by the motor/generator 14. In other embodiments, another pair of wheels 22 may also be directly powered by the motor/generator 14 or by an additional motor/generator. The wheels 20 are rear wheels in the embodiment shown; however, the powertrain 12 may alternatively be operatively connected for propelling the front wheels of a vehicle in another embodiment.

The motor/generator 16 has a rotor 24 and a stator 25. The stator 25 is grounded to a stationary member 50, such as a transmission casing, and surrounds an outer surface of the rotor 24 so that an annular gap 26 is defined between the stator 25 and the rotor 24. The rotor 24 rotates about an axis of rotation 28 when electric power is provided to a stator 25 from the energy storage device 18. The motor/generator 16 is controlled by an electronic controller 30 according to various vehicle operating conditions as described herein. The motor/generator 16 may be controlled to function as a motor to add torque at the vehicle wheels 20, or as a generator, to convert torque at the wheels 20 to electrical energy stored in the energy storage device 18.

The rotor 24 is mechanically connected to the vehicle wheels 20 through a gearing arrangement 40 and a final drive mechanism 54. The gearing arrangement 40 is a planetary gear set and may be referred to as such. Specifically, a rotor shaft 32 rotates with the rotor 24 and is connected for rotation with a sun gear 42 of the planetary gear set 40. A carrier member 46 of the planetary gear set 40 supports planetary gears 47 that mesh with both the sun gear 42 and a ring gear 44 of the planetary gear set 40. The ring gear 44 is grounded to the stationary member 50. A shaft 52 that rotates with the carrier member 46 transfers torque through the final drive mechanism 54, such as a differential mechanism, to the vehicle wheels 20, as indicated by arrow 56.

The motor/generator 16 and the planetary gear set 40 require cooling and lubrication. A pump 60 is connected with the energy storage device 18 and receives electric energy from the energy storage device 18 to provide transmission oil 65 to the motor/generator 16 and to the planetary gear set 40. The pump 60 is referred to as an auxiliary pump because it is not powered by rotation of the motor/generator 16, so that its speed and output are not determined by rotation of the rotor 24. In other embodiments, such as a vehicle that is a non-hybrid vehicle, the pump 60 may be a mechanical pump. The oil is directed from a sump (not shown) in the transmission 14 through the pump 60. The oil 65 then drains back to the sump, forming a cooling circuit.

Because the motor/generator 16 is mechanically connected to the wheels 20, the rotor 24 always rotates at a speed proportional to the wheels 20, and slowing of the rotor 24 results in a slowing of the wheels 20. During instances when vehicle deceleration is desired, the motor/generator 16 can be controlled to function as a generator, converting some of the torque of the rotor 24 to electric energy stored in the stator. Such a conversion of kinetic energy into stored electrical energy to decelerate the vehicle 10 may be referred to as a regenerative braking mode. Under some vehicle operating conditions, however, the regenerative braking mode may not be feasible. For example, if the state of charge of the energy storage device 18 is above a predetermined state of charge, then additional electric energy cannot be stored in the energy storage device 18.

As shown in FIG. 2, the pump 60 has outlets 62, 64 that are configured to direct oil into the annulus 26 and at the planetary gear set 40. The oil may be directed through channels in the transmission casing 50, through nozzles, or otherwise at the annulus 26 and at the planetary gear set 40. The annulus 26 is relatively small, and the oil directed into the annulus 26 creates a drag on the rotor 24, and thus slow the wheels 20. Oil 65 directed at the planetary gear set 40 also creates a drag on the planetary gear set 40 and contributes to slowing of the wheels 20. By controlling the rate of oil flow from the pump 60, the pressure of oil delivered by the pump 60, or both, deceleration of the vehicle wheels 20 can be controlled and the temperature of the oil 65 can also be controlled.

The controller 30 receives input indicative of vehicle operating conditions that are then considered according to a stored algorithm to determine whether vehicle deceleration by controlling oil to the motor/generator according to the method 200 of FIG. 3 is to be implemented. Specifically, the controller 30 receives inputs in the form of electrical signals indicative of various vehicle operating conditions. As shown in FIG. 1, the controller 30 receives several inputs 70, 72, 74 indicative of a desired vehicle deceleration or indicative of an oil temperature below a predetermined temperature. Input 70 is an input of an operating condition of a vehicle braking device such as a brake pedal 80. The brake pedal 80 is operatively connected to brakes 82 at the vehicle wheels 20. The input 70 may be an indication of the position of the brake pedal 80, which is depressed when vehicle deceleration is desired. Input 72 is an input of an operating condition of a vehicle acceleration device such as an accelerator pedal 84. The input 72 may be an indication of the position of the accelerator pedal 84, which may be released fully when vehicle deceleration is desired. In the vehicle 10, the acceleration is provided only by the motor/generator 16. In other embodiments, acceleration may be provided by an engine or other prime mover, and the accelerator pedal would be operatively connected to the engine or other prime mover.

The controller 30 also receives an input 74 which is indicative of a position of a transmission gear selector 86. In the vehicle 10 shown, there are no clutches that are engaged to shift between different gears. Accordingly, the position of the gear selector 86 is provided to the controller 30, which then controls the motor/generator 16 to provide an output torque consistent with a selected gear. A low gear may be selected, for example, when the vehicle 10 is being driven downhill.

The controller 30 also considers information regarding the operating conditions of the energy storage device 18. Specifically, the controller 30 receives an input 76 from the energy storage device 18 indicative of the state of charge of the energy storage device. As used herein, the "state of charge" of the energy storage device 18 is the available capacity remaining in the energy storage device, expressed as a percentage of the rated capacity. The state of charge may be affected by voltage, current, temperature, and other factors. Optionally, the controller also receives another input 77 from the energy storage device 18 indicative of the charge power of the energy storage device 18. The controller considers the inputs 76, 77 in determining whether vehicle deceleration may be accomplished by operating the motor/generator 16 as a motor under the current vehicle operating conditions.

Another vehicle operating condition considered by the controller 30 is the temperature of the oil in the motor/generator 16. The controller 30 receives an input 78 indicative of the temperature of the oil provided by the pump 60. The oil 65 is warmed when it contacts the motor/generator 16 and planetary gear set 40. Because spin losses created by the oil 65 decrease as the temperature of the oil 65 increases, utilization of the oil 65 according to the method 200 may decrease transmission losses.

Referring to FIG. 3, the method 200 begins with block 202, in which the controller 30 determines whether vehicle deceleration is desired. That is, the controller 30 determines whether a request for negative wheel torque at the wheels 20 is indicated based on the inputs 70 and 72. If input 70 indicates that the brake pedal 80 is depressed, or if input 72 indicates that the position of the accelerator pedal 84 has been fully or partially released, by comparing these to previous indications by inputs 70, 72, the controller 30 may determine that deceleration of the vehicle 10 is desired.

If it is determined that vehicle deceleration is desired, under the method 200, the controller 30 then considers other operating conditions to determine whether deceleration by control of oil flow from the pump 60 is warranted. In box 204, the controller 30 determines whether the state of charge of the energy storage device 18 is greater than a predetermined state of charge. The controller 30 uses the input 76 indicative of the state of charge of the energy storage device 18 and compares it to a predetermined value to make the determination of block 204. If the state of charge of the energy storage device 18 is greater than the predetermined state of charge, then deceleration of the vehicle 10 by regenerative braking may not be feasible, as the energy storage device 18 may not have reserve capacity required to receive electric power from the motor/generator 16. Thus, the method 200 continues to block 206. If, however, the state of charge of the energy storage device 18 is not greater than the predetermined state of charge, then regenerative braking may be the preferred method of accomplishing deceleration, and the method 200 returns to block 202 until a determination of a subsequent desire for vehicle deceleration is made.

In block 206, the controller 30 determines whether a level of charge of the energy storage device 18 is greater than a predetermined level of charge power. The controller 30 uses the input 77 indicative of a level of charge power of the energy storage device 18 and compares it to a predetermined value of a level of charge power to make the determination of block 206. If the level of charge power of the energy storage device 18 is greater than the predetermined level of charge power, then deceleration of the vehicle 10 by regenerative braking may not be feasible, as the energy storage device 18 may not have reserve capacity required to receive electric power from the motor/generator 16. Thus, the method 200 continues to block 208. If, however, the level of charge power of the energy storage device 18 is not greater than the predetermined level of charge power, then regenerative braking may be the preferred method of accomplishing deceleration, and the method 200 returns to block 202 until a subsequent input indicating a desire for vehicle deceleration is received by the controller 30. The predetermined value of a level of charge used as the basis for comparison with the level of charge based on input 77 may be varied with the temperature of the energy storage device 18, which may also be an input to the controller 30. For example, if the temperature of the energy storage device 18 is low, it may be desirable to warm the energy storage device, which can be accomplished by directing electrical energy to the energy storage device from the motor/generator 16 functioning as a generator, such as during regenerative braking. In that instance, the predetermined level of charge used in block 206 as a basis for comparison to the level of charge indicated by input 77 might be decreased, so that regenerative braking (and hence warming of the energy storage device 18) is favored at these low temperatures over deceleration by oil directed from the pump 60. In contrast, if the temperature of the energy storage device 18 is high, it may be desirable to accomplish the deceleration by control of oil 65 from the pump 60 rather than by regenerative braking even when the state of charge of the energy storage device 18 is the same under both temperatures, so that the temperature of the energy storage device is not further increased.

If affirmative determinations are made in blocks 202, 204 and 206 as described above, then in block 208 the controller 30 sends a control signal 80 that causes the pump 60 to increase either its rate of flow of oil to the motor/generator 16, or the pressure of oil delivered to the motor/generator 16. The control signal 80 may be an electrical signal received by the pump 60 to increase pump speed, thus increasing the rate of flow, or may be an electric signal received by a solenoid or other type of valve that controls an outlet orifice of the pump 60, thus increasing pump flow. With increased pressure or rate of flow, the oil will cause an increased drag on the rotor 24 and on the planetary gear set 40, thus slowing the wheels 20.

Other vehicle operating conditions may also be considered under the method 200 in addition to those considered in blocks 204 and 206. For example, in block 210, after a determination of a desired vehicle deceleration is determined in block 202, the controller 30 makes a determination based on input 74 as to whether a driver of the vehicle has selected a low gear on the gear selector mechanism 86. If a low gear has been selected, this may be indicative, for example, of the vehicle 10 being on an extended downhill. If a low gear has not been selected according to the determination of block 210, the method 200 returns to block 202 until a subsequent input indicating a desire for vehicle deceleration is received by the controller 30. If a low gear has been selected according to the determination made in block 210, then the method 200 may proceed directly to block 208 to cause the pump 60 to increase either its rate of flow of oil to the motor/generator 16, or the pressure of oil delivered to the motor/generator 16 and/or the planetary gear set 40. The rate of flow and the pressure may be different than the rate or pressure commanded in block 208 following block 204 and 206. For example, if the controller 30 has determined that a low gear has been selected, at least some deceleration due to the oil flow from the pump 60 may be commanded regardless of the state of charge and the charge power of the energy storage device. The deceleration due to the rate of flow or pressure of oil from the pump 60 may be in addition to any deceleration accomplished by controlling the motor/generator 16 to function as a generator to provide regenerative braking.

Alternatively, following a positive determination of a driver-selected low gear in block 210, the method 200 may instead move to block 204, as indicated by the dashed line, to determine the state of charge of the energy storage device 18 in comparison to a predetermined state of charge. Because a low gear has been selected for the vehicle 10, the numerical value of the predetermined state of charge used as a basis of comparison for the state of charge of the energy storage device 18 may be different than the numerical value of the predetermined state of charge used in block 202 when the gear selection mechanism 86 has not been placed in a low gear. For example, the predetermined state of charge may be a higher numerical value than when block 202 is considered with the vehicle 10 not in a driver-selected low gear. This higher value may be selected because the motor/generator 16 may be controlled to provide regenerative braking to a greater extent when the vehicle is placed in the low gear. Accordingly, the need for deceleration due to the oil flow and pressure may be triggered only at a higher state of charge of the energy storage device 18.

After block 204, if the state of charge indicated by input 76 is greater than the predetermined state of charge, the method 200 may then proceed to block 206, but the numerical value of the predetermined level of charge power used as the basis for comparison with the input 77 in block 206 may be less than the numerical value of the level of charge power used in block 206 when the controller 30 has not received an input 74 indicating that the vehicle 10 is in a drive-selected low gear. If the level of charge power indicated by input 77 is less than the predetermined level of charge power, then the method 200 proceeds to block 208 to command an increase in the flow rate or in the pressure of oil flowing from the pump 60 to the motor/generator 16 to decelerate the vehicle 10. The numerical value of the flow rate or pressure may be different than the numerical value commanded in block 208 when the vehicle has been placed in the drive-selected low gear than when the vehicle 10 has not been placed in the driver-selected low gear. For example, a greater flow rate or a greater pressure may be provided if the determination of a driver-selected low gear made in block 210 is positive, creating a greater deceleration provided by the control of oil from the pump 60 than if the vehicle 10 is not placed in a driver-selected low gear.

Still other vehicle operating conditions may also be considered under the method 200 in addition to those considered in blocks 204, 206 and 210. For example, in block 212, the controller 30 makes a determination based on input 78 as to whether temperature of the oil directed to the motor/generator 16 and to the planetary gear set 40 is below a predetermined temperature level. Spin losses in the transmission 14 increase as the temperature of the oil decreases. If a greater flow rate of oil or a greater pressure of oil is directed to the annulus 26 and toward the planetary gear set 40, then the temperature of the oil will be increased by circulating and contacting the motor/generator 16 and the planetary gear set 40. Accordingly, if it is determined in block 212 that the oil temperature is below a predetermined temperature, then the method 200 may move directly to block 208 to cause the pump 60 to increase either its rate of flow of oil or the pressure of oil delivered to the motor/generator 16 and/or the planetary gear set 40. The rate of flow and the pressure may be different than that rate or pressure commanded in block 208 following block 204 and 206, or following block 210, however. Alternatively, the method 200 may proceed to blocks 204 and 206 and then only to block 208 if positive determinations are made that a state of charge of the energy storage device 18 and a level of charge of the energy storage device 18 are above predetermined values, which may be different than the predetermined values used for these determinations if the method 200 is not proceeding to blocks 204 and 206 following block 212.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
   wheels;
   a rotating component;
   an electric motor/generator operatively connected to the wheels;
   an energy storage device operatively connected to the motor/generator for providing power to the motor/generator to cause the motor/generator to function as a motor and for receiving power from the motor/generator to cause the motor/generator to function as a generator;
   an oil pump operatively connected to at least one of the rotating component and the electric motor/generator and operable to provide oil flow to said at least one of the rotating component and the electric motor/generator;
   an electronic controller operatively connected to the oil pump and to the wheels, and configured to increase at least one of a rate of flow of oil and pressure of oil provided to said at least one of the rotating component and the motor/generator by the oil pump under at least one predetermined vehicle operating condition to thereby slow the wheels or increase oil temperature to reduce friction losses; and
   wherein said at least one predetermined vehicle operating condition is a state of charge of the energy storage device greater than a predetermined state of charge or a temperature of the oil less than a predetermined temperature.

2. The vehicle of claim 1, wherein the electric motor/generator has a stator and a rotor, and further comprising:
   a shaft rotatable with the rotor;
   wherein the rotating component is a gearing arrangement operatively connecting the shaft with the wheels.

3. The vehicle of claim 1, wherein the vehicle has an absence of an internal combustion engine.

4. The vehicle of claim 1, wherein the rotating component is a rotor of the electric motor/generator that is operatively connected to the wheels; wherein the electric motor/generator has a stator, and the stator and the rotor are arranged to define an annular gap between the stator and the rotor; and wherein the oil flow is directed to the annular gap.

5. The vehicle of claim 4, further comprising:
   wherein the energy storage device is operatively connected to the stator for providing power to the motor/generator to cause the motor/generator to function as a motor and for receiving power from the motor/generator to cause the motor/generator to function as a generator.

6. The vehicle of claim 4,
   wherein the energy storage device is operatively connected to the stator for providing power to the motor/generator to cause the motor/generator to function as a motor and for receiving power from the motor/generator to cause the motor/generator to function as a generator; and
   wherein said at least one predetermined vehicle operating condition includes a level of charge power of the energy storage device less than a predetermined level of charge power.

7. The vehicle of claim 1, wherein said at least one predetermined vehicle operating condition includes a transmission gear selector positioned in a predetermined position.

8. The vehicle of claim 1, further comprising:
   a driver-operated vehicle braking device;
   a driver-operated vehicle acceleration device; and
   wherein said at least one predetermined vehicle operating condition includes an operating condition of the vehicle braking device and an operating condition of the vehicle acceleration device.

9. A method of controlling oil delivery in a vehicle comprising:
   increasing via an electronic controller at least one of rate of flow of oil and pressure of oil flowing from an oil pump to at least one of a motor/generator and a gearing arrangement operatively connected to vehicle wheels, thereby increasing at least one of resistance to rotation of said at least one of the motor/generator and the gearing arrangement to slow the vehicle wheels or to increase oil temperature to reduce friction losses; wherein said increasing is in response to at least one vehicle operating condition; and wherein said at least one vehicle operating condition is at least one of a state of charge of an energy storage device greater than a predetermined state of charge or a temperature of the oil less than a predetermined temperature.

10. The method of claim 9, wherein said at least one vehicle operating condition includes an operating condition of a driver-operated vehicle braking device and an operating condition of a driver-operated vehicle acceleration device.

11. The method of claim 9, wherein the energy storage device is operatively connected to a stator of the motor/generator for providing power to the motor/generator to cause the motor/generator to function as a motor and for receiving power from the motor/generator to cause the motor/generator to function as a generator.

12. The method of claim 9, wherein the energy storage device is operatively connected to a stator of the motor/generator for providing power to the motor/generator to cause the motor/generator to function as a motor and for receiving power from the motor/generator to cause the motor/generator to function as a generator; and wherein said at least one vehicle operating condition includes a level of charge power of the energy storage device greater than a predetermined level of charge power.

13. The method of claim 9, wherein said at least one vehicle operating condition includes a transmission gear selector positioned in a predetermined position.

14. A method of decelerating a vehicle that has wheels propelled by torque from a motor/generator comprising:

receiving via an electronic controller an input of a vehicle operating condition indicative of a desired deceleration of vehicle wheels;

determining via the electronic controller whether a state of charge of an energy storage device operatively connected to the motor/generator is greater than a predetermined state of charge;

determining via the electronic controller whether a transmission gear selector is positioned in a predetermined position;

determining via the electronic controller whether a temperature of oil directed to the motor/generator by an auxiliary oil pump powered by the energy storage device is less than a predetermined temperature; and increasing via the electronic controller at least one of rate of flow of oil and pressure of oil flowing from the auxiliary oil pump to the motor/generator if the state of charge of the energy storage device is greater than the predetermined state of charge, the transmission gear selector is positioned in the predetermined position, or the temperature of oil directed to the motor/generator by the auxiliary oil pump is less than the predetermined temperature.

* * * * *